(12) United States Patent
Takahashi et al.

(10) Patent No.: US 7,416,231 B2
(45) Date of Patent: Aug. 26, 2008

(54) COLLISION DETECTING APPARATUS FOR VEHICLE

(75) Inventors: Hisashi Takahashi, Kariya (JP); Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 308 days.

(21) Appl. No.: 11/376,684

(22) Filed: Mar. 15, 2006

(65) Prior Publication Data

US 2006/0208510 A1    Sep. 21, 2006

(30) Foreign Application Priority Data

Mar. 17, 2005    (JP)    ............................. 2005-076881

(51) Int. Cl.
    *B60R 19/02*    (2006.01)
(52) U.S. Cl. .................... 293/102; 73/379.04; 180/274; 180/275; 340/436; 340/435; 340/903
(58) Field of Classification Search ................. 293/102, 293/120; 73/12.01, 379.04, 379.05; 180/45, 180/46, 48, 301; 340/435, 436, 901, 903, 340/904; 701/45, 46, 48, 301
See application file for complete search history.

(56) References Cited

U.S. PATENT DOCUMENTS

| | | | |
|---|---|---|---|
| 6,193,303 B1 * | 2/2001 | Urushiyama et al. ... | 296/187.03 |
| 6,784,792 B2 | 8/2004 | Mattes et al. | |
| 2006/0100763 A1 * | 5/2006 | Tanabe ........................ | 340/436 |
| 2006/0185922 A1 * | 8/2006 | Tanabe ........................ | 180/274 |
| 2007/0187959 A1 * | 8/2007 | Adachi et al. ............... | 293/120 |

* cited by examiner

*Primary Examiner*—Lori L Lyjak
(74) *Attorney, Agent, or Firm*—Harness, Dickey & Pierce, PLC

(57) ABSTRACT

A collision detecting apparatus has a plurality of collision detecting means and a determination means for determining a collision based on at least one of outputs of the plurality of collision detecting means. Each of the collision detecting means has a crank member and a deformation detecting member disposed at the center of a middle portion of the crank member for detecting a deformation of the middle portion. Each of the crank member has a first extending portion extending from a first end of the middle portion and a second extending portion extending from a second end of the middle portion in a direction opposite to the first extending portion. A first collision detecting means and a second collision detecting means are arranged in opposite directions between a reinforcement member and one of side members.

13 Claims, 6 Drawing Sheets

COLLISION DETECTING APPARATUS FOR VEHICLE

CROSS REFERENCE TO RELATED APPLICATION

This application is based on Japanese Patent Application No. 2005-76881 filed on Mar. 17, 2005, the disclosure of which is incorporated herein by reference.

FIELD OF THE INVENTION

The present invention relates to a vehicle collision detecting apparatus for operating a pedestrian protecting device.

BACKGROUND OF THE INVENTION

A method and an apparatus for recognizing a collision of a vehicle with a pedestrian are known, for example, in JP-A-2003-535769 (U.S. Pat. No. 6,784,792 B2). In the apparatus, sensors, such as a deformation sensor and a pressure sensor, for detecting an impact to the vehicle are mounted on a bonnet and a front bumper. A type of a collided object is determined based on the impact detected by the sensors. Particularly, it is determined whether the collided object is a pedestrian. In general, such sensors are arranged to extend long in a horizontal direction along the bumper and a bumper reinforcement member.

SUMMARY OF THE INVENTION

It is an object of the present invention to provide a collision detecting apparatus for a vehicle, having an arrangement structure of collision detecting means, without largely decreasing a rigidity of the vehicle.

According to an aspect of the present invention, the collision detecting apparatus has a plurality of collision detecting means and a determination means for determining a collision based on at least one of outputs of the plurality of collision detecting means. The plurality of collision detecting means is located between a reinforcement member and one of side members of the vehicle. Each of the collision detecting means has a crank member and a deformation detecting member.

The crank member of each of the collision detecting means has a middle portion having a resiliency, a first extending portion extending from a first end of the middle portion and a second extending portion extending from a second end of the middle portion in a direction opposite to the first extending portion. The deformation detecting member is attached to the center of the middle portion for detecting deformation of the middle portion.

A first collision detecting means, which is one of the plurality of collision detecting means, and a second collision detecting means, which is another one of the plurality of collision detecting means, are arranged in opposite directions. Namely, the middle portion of the first collision detecting means is parallel to the middle portion of the second collision detecting means. The first extending portion of the first collision detecting means and the second extending portion of the second collision detecting means extend in the same direction and connect to the reinforcement member. Further, the second extending portion of the first collision detecting means and the first extending portion of the second collision detecting means extend in the same direction and connect to the side member.

For example, the first collision detecting means is arranged such that the first extending portion connects to a first part of the reinforcement member and the second extending portion connects to a second part of the side member. The second collision detecting means is arranged such that the first extending portion connects to a first part of the side member and the second extending portion connects to a second part of the reinforcement member. Here, the first parts of the reinforcement member and the side member are located higher than the second parts of the reinforcement member and the side member, respectively.

Alternatively, the first collision detecting means can be arranged horizontally such that the first extending portion connects to a first part of the reinforcement member and the second extending portion connects to a second part of the side member, and the second collision detecting means can be arranged horizontally such that the first extending portion connects to a first part of the side member and the second extending portion connects to a second part of the reinforcement member. Here, the first parts of the reinforcement member and the side member are located on a right side of the second parts of the reinforcement member and the side member, respectively.

Accordingly, the crank members of the collision detecting means are arranged in opposite directions. As compared to a case in which the crank members are arranged in the same direction, the arrangement of the present invention improves a rigidity of the vehicle even if the collision detecting means are located between the reinforcement member and the side member. Further, even if a collision load is partly applied to the reinforcement member, that is, the collision load is biased to a part of the reinforcement member, the biased load is effectively dispersed. Therefore, accuracy for detecting an impact to a bumper improves.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1A:
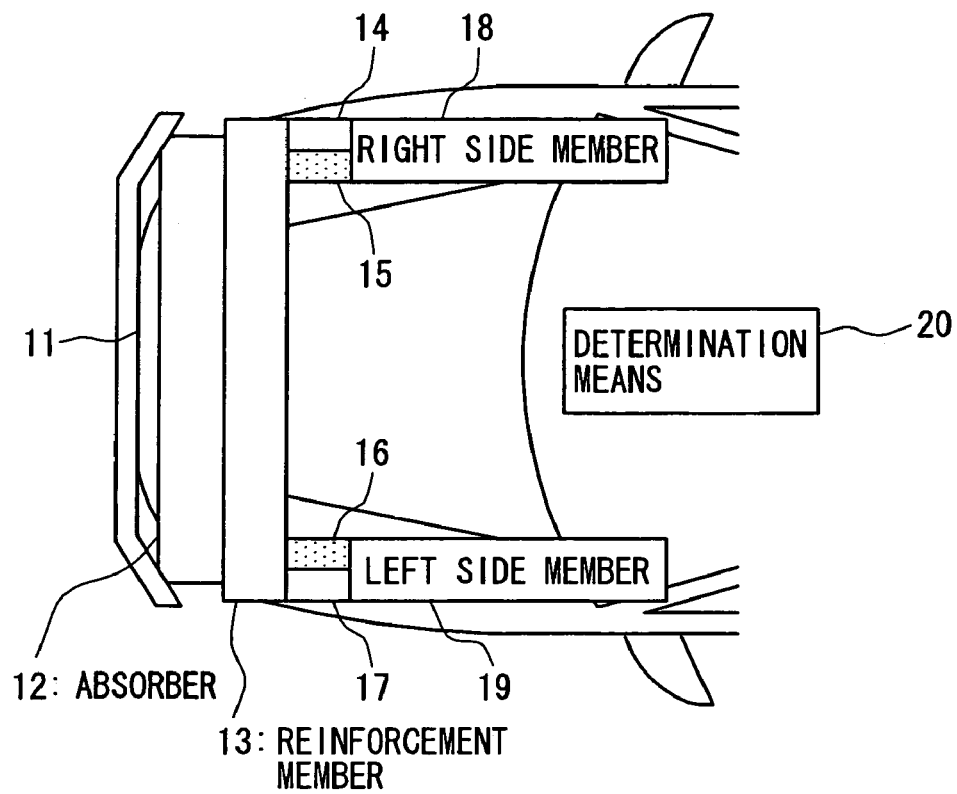
FIG. 1A is an explanatory schematic top view of a front part of a vehicle, for showing an arrangement of a collision detecting apparatus on the vehicle, according to a first embodiment of the present invention.
Figure 1B:
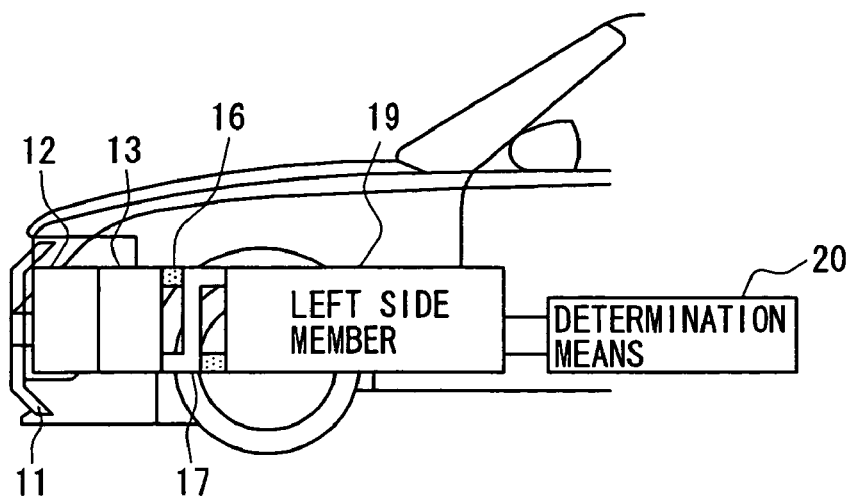
FIG. 1B is an explanatory schematic side view of the front part of the vehicle shown in FIG. 1A.

A first embodiment of the present invention will now be described with reference to FIGS. 1A through 6 and FIGS. 11 through 13. As shown in FIGS. 1A and 1B, a front bumper 11 is located on a front side of an absorber 12 at a front part of a vehicle. The absorber 12 is provided to reduce an impact when the front bumper 11 is collided with a collision object. The absorber 12 is located on a front side of a bumper reinforcement member 13.

A collision detecting apparatus of the invention is generally constructed of a plurality of crank deformation sensors 14 to 18 as collision detecting means and a determination means 20 for determining a collision. A right end of the reinforcement member 13 is fixed to a right side member 18 through a right outer crank deformation sensor 14 (hereafter, right outer sensor) and a right inner crank deformation sensor 15 (hereafter, right inner sensor). The right outer sensor 14 is located at an outermost part of a right side of the vehicle. The right inner sensor 15 is located on an inner side of the right outer sensor 14, that is, located on a left side of the right outer sensor 14.

Likewise, a left end of the reinforcement member 13 is fixed to a left side member 19 through a left outer crank deformation sensor 17 (hereafter, left outer sensor) and a left inner crank deformation sensor 16 (hereafter, left inner sensor). The left outer sensor 17 is located at an outermost part of a left side of the vehicle. The left inner sensor 16 is located on an inner side of the left outer sensor 17, that is, located on a right side of the left outer sensor 17.

Figure 2:
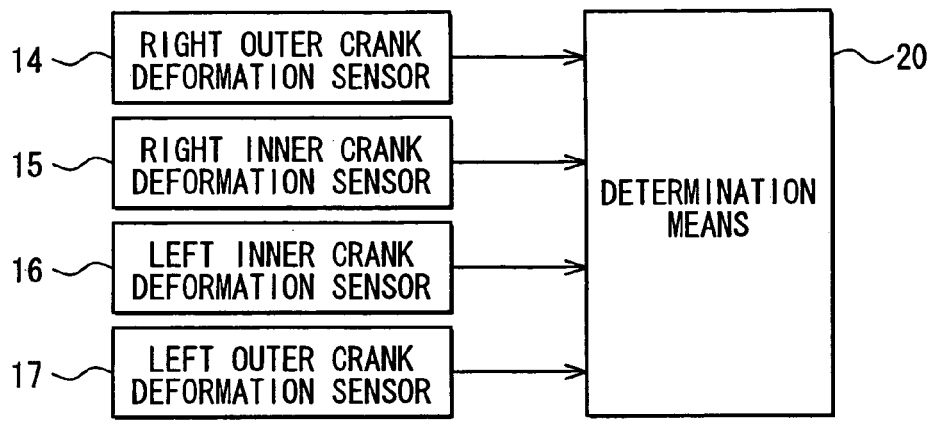
FIG. 2 is a block diagram of the collision detecting apparatus according to the first embodiment of the present invention.

The determination means 20 is located on a floor of the vehicle. As shown in FIG. 2, outputs of the sensors 14 to 18 are sent to the determination means 20. The determination means 20 outputs a determination result based on the outputs of the sensors 14 to 18.

Figure 3:
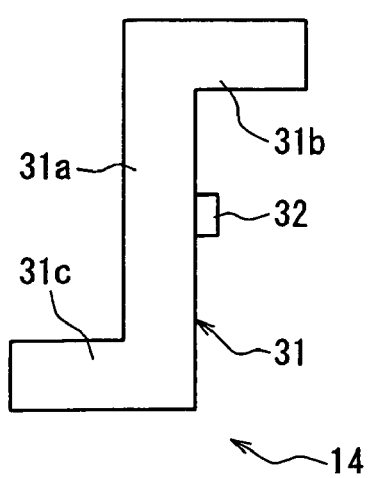
FIG. 3 is an enlarged side view of a crank deformation sensor of the collision detecting apparatus according to the first embodiment of the present invention.

The sensors 14 to 18 have a similar shape. In FIG. 3, the right outer sensor 14 is shown as an example. As shown in FIG. 3, each of the sensor 14 to 18 has a metallic crank member 31 and a deformation gauge 32 as a deformation detecting member. In FIG. 3, an up and down direction corresponds to an up and down direction (vertical direction) of a vehicle when the sensor 14 is mounted on the vehicle. A left and right direction of FIG. 3 corresponds to a front and rear direction (horizontal direction) of the vehicle when the sensor 14 is mounted on the vehicle.

The crank member 31 has a middle portion 31a on which the deformation gauge 32 is attached, a first extending member 31b and a second extending member 31c. The middle portion 31a extends in the vertical direction. The first extending portion 31b extends from a first end (top end) of the middle portion 31b in the horizontal direction. The second extending portion 31c extends from a second end (bottom end) of the middle portion 31a in the horizontal direction, but in a direction opposite to the first extending portion 31c.

The middle portion 31a has a resiliency in the horizontal direction. The deformation gauge 32 is attached to the center of the middle portion 31a. When a load is applied to the first extending portion 31b and the second extending portion 31c, the middle portion 31a is deformed. At this time, the deformation gauge 32 detects a degree of deformation and outputs the detected value as a collision load applied to the right outer sensor 14.

Figure 4:
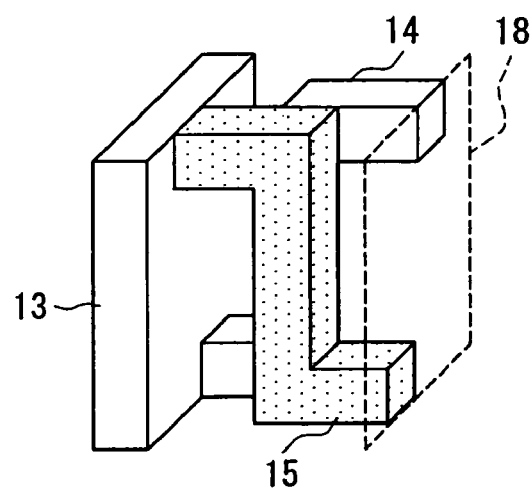
FIG. 4 is a perspective view of crank deformation sensors in which crank deformation sensors are arranged in opposite directions according to the first embodiment of the present invention.

FIG. 4 shows a perspective view of the right outer sensor 14 and the right inner sensor 15 located between the reinforcement member 13 and the right side member 18, when viewed from the inside of the vehicle. As shown in FIG. 4, The right outer sensor 14 and the right inner sensor 15 have the same shape, but are arranged in opposite directions between the reinforcement member 13 and the right side member 18. Also, the right outer sensor 14 connects a lower part of the reinforcement member 13 to an upper part of the right side member 18. The right inner sensor 15 connects an upper part of the reinforcement member 13 to a lower part of the right side member 18.

More specifically, the right outer sensor 14 is arranged such that the first extending portion 31b connects to the upper part of the right side member 18 and the second extending portion 31c connects to the lower part of the reinforcement member 13. The right inner sensor 15 is arranged such that the first extending portion 31b connects to the upper part of the reinforcement member 13 and the second extending portion 31c connects to the lower part of the right side member 18.

Likewise, the left inner sensor 16 and the left outer sensor 17 are arranged in opposite directions between the reinforcement member 13 and the left side member 19. Further, the right inner sensor 16 connects the upper part of the reinforcement member 13 to a lower part of the left side member 19. The right outer sensor 17 connects the lower part of the reinforcement member 13 to an upper part of the left side member 19.

The above arrangement of the sensors 14 to 18 has the following advantage. The advantage will be described with reference to FIGS. 4 to 6 and FIGS. 11 to 13 as a comparison.

Figure 5:
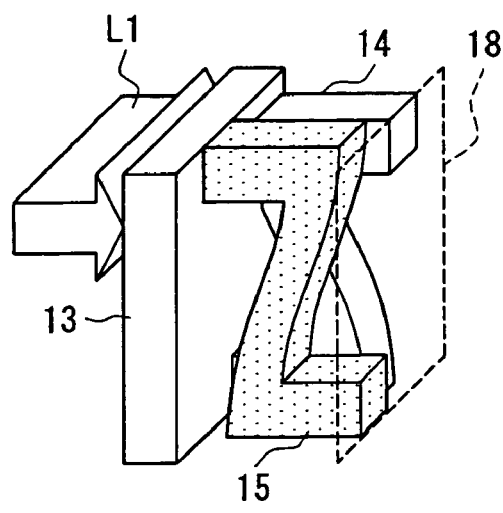
FIG. 5 is an explanatory perspective view of crank deformation sensors shown in FIG. 4 when the crank deformation sensors are deformed by a biased load according to the first embodiment of the present invention.

FIG. 5 shows a deforming operation of the right outer sensor 14 and the right inner sensor 15 when a collision load L1 is applied to the upper part of the reinforcement member 13 in the rearward direction. Here, the collision load L1 is biased to the upper part of the reinforcement member 13. Thus, the collision load L1 will be referred to as a biased load, hereafter. It is assumed that the reinforcement member 13 is not fixed. When the reinforcement member 13 receives the biased load L1, the reinforcement member 13 leans and rotates about the part to which the biased load L1 is applied in a clockwise direction of FIG. 5.

Since the right outer sensor 14 and the right inner sensor 15 are disposed in the opposite directions with respect to the reinforcement member 13, the right inner sensor 15, which connects to the upper part of the reinforcement member 13, receives a pressure load in the right direction of FIG. 5. Thus, the right inner sensor 15 generates resiliency against the pressure load. On the contrary, the right outer sensor 14, which connects to the lower part of the reinforcement member 13, receives a tensile stress in the left direction of FIG. 5. Thus, the right outer sensor 14 generates resiliency against the tensile stress.

Accordingly, the biased load L1 is dispersed. Therefore, the reinforcement member 13 and the right side member 18 are maintained generally parallel to each other. Namely, the first extending portions 31b and the second extending portions 31c of both of the right outer sensor 14 and the right inner sensor 15 are maintained in parallel.

Figure 6:
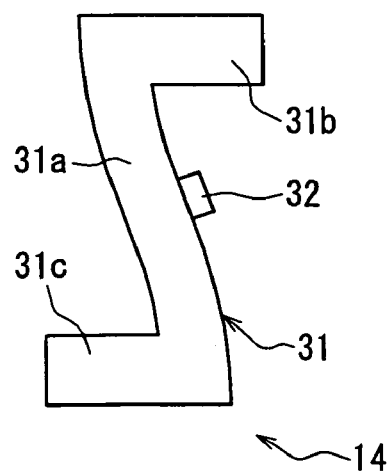
FIG. 6 is an enlarged side view of the crank deformation sensor when it is deformed by the biased load according to the first embodiment of the present invention.

An ideal detecting condition (hereafter, an ideal condition) of the sensors 14 to 18 is shown in FIG. 6. Specifically, even when the collision load is applied, the first extending portion 31b and the second extending portion 31c are always maintained parallel while the center of the middle portion 31a is deformed.

Accordingly, even if the collision load L1 is partly applied to the reinforcement member 13, for example, to the upper part, the lower part or the middle part, it is less likely that the sum of the outputs of the right outer sensor 14 and the right inner sensor 15 will be affected by the biased load. Therefore, the arrangement shown in FIG. 4 is effective to improve detection accuracy.

Figure 11:
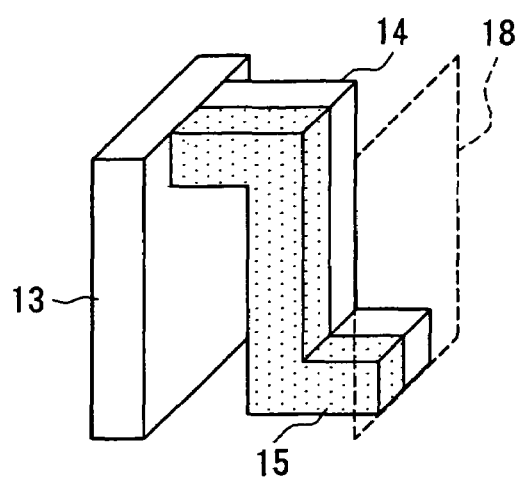
FIG. 11 is a perspective view of crank deformation sensors arranged in the same direction as a comparison with the arrangement of the crank deformation sensors of the first embodiment of the present invention.

The rigidity of the arrangement shown in FIG. 4 will be compared to a case in which the sensors 14, 15 are arranged in the same direction, as shown in FIG. 11. FIG. 11 shows a perspective view of the sensors 14, 15, which are arranged in the same direction between the reinforcement member 13 and the right side member 18, when viewed from the inside of the vehicle.

In FIG. 11, the right outer sensor 14 and the right inner sensor 15 hold one side (upper part) of the reinforcement member 13. The sensors 14, 15 connect the upper part of the reinforcement member 13 to the lower part of the right side member 18. In this arrangement, the rigidity is smaller than that of the opposite arrangement shown in FIG. 4.

Figure 12:
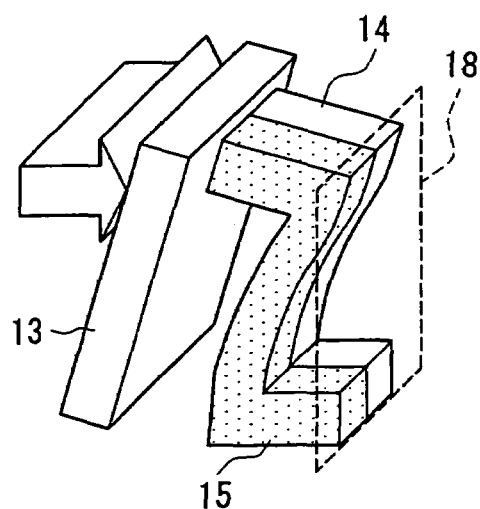
FIG. 12 is an explanatory perspective view of the crank deformation sensors shown in FIG. 11 when the crank deformation sensors are deformed by the biased load.

Referring to FIGS. 5 and 12, the deformation of the sensors 14, 15 shown in FIG. 4 will be compared to the deformation of the sensors 14, 15 shown in FIG. 11. As described in the above, in the opposite arrangement shown in FIG. 4, the right outer sensor 14 and the right inner sensor 15 maintain the ideal condition even when the biased load L1 is applied.

On the contrary, when the biased load L1 is applied to the sensors 14, 15 that are arranged in the same direction shown in FIG. 11, the surface of the right side member 18, which is opposed to the reinforcement member 13, and the surface of the reinforcement member 13, which is opposed to the right side member 18, are largely different from the ideal condition, as shown in FIG. 12. That is, the surface of the reinforcement member 13 is not parallel to the surface of the right side member 18.

Figure 13:
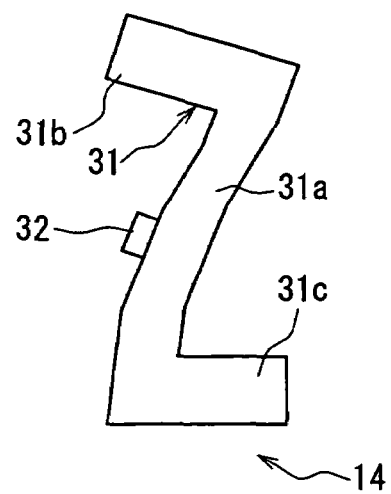
FIG. 13 is an enlarged side view of the crank deformation sensor shown in FIG. 12.

FIG. 13 shows the deformation of the sensor 14 when the sensors 14, 15 are arranged in the same direction. As shown in FIG. 13, the sensor 14 is deformed mainly at a portion adjacent to the second extending portion 31c, instead of the center of the middle portion 31c. As a result, it is difficult to accurately detect the collision load with the deformation gauze 32, which is attached to the center of the middle portion 31a.

Accordingly, when the sensors 14 to 18 are arranged in the opposite directions as described above, the rigidity between the reinforcement member 13 and the right and left side member 18, 19 increases. In other words, even when the sensors 14 to 18 are arranged between the reinforcement member 13 and the right and left side members 18, 19, the rigidity of the vehicle is not largely decreased, as compared with the rigidity in which the reinforcement member is directly connected to the side members. Even when the collision load to the reinforcement member 13 is biased, the sensors 14 to 18 maintain the ideal detecting condition. Accordingly, the accuracy to detect the collision load from the front side improves while sufficiently maintaining the rigidity.

Figure 7A:
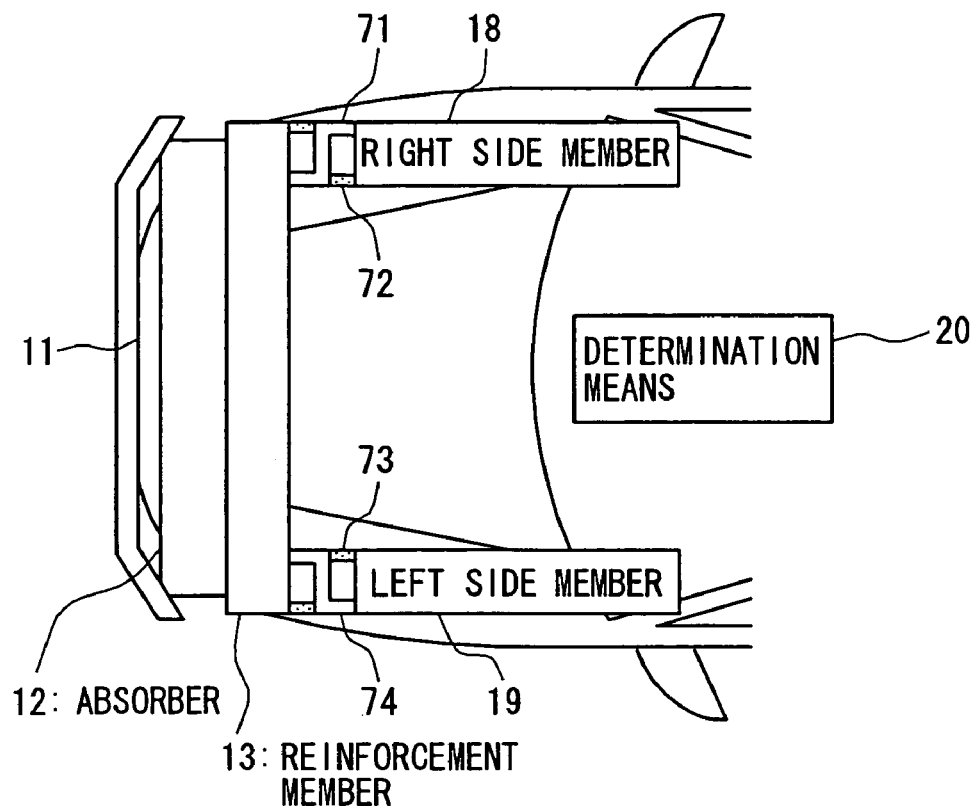
FIG. 7A is an explanatory schematic top view of a front part of a vehicle, for showing the arrangement of crank deformation sensors according to a second embodiment of the present invention.
Figure 7B:
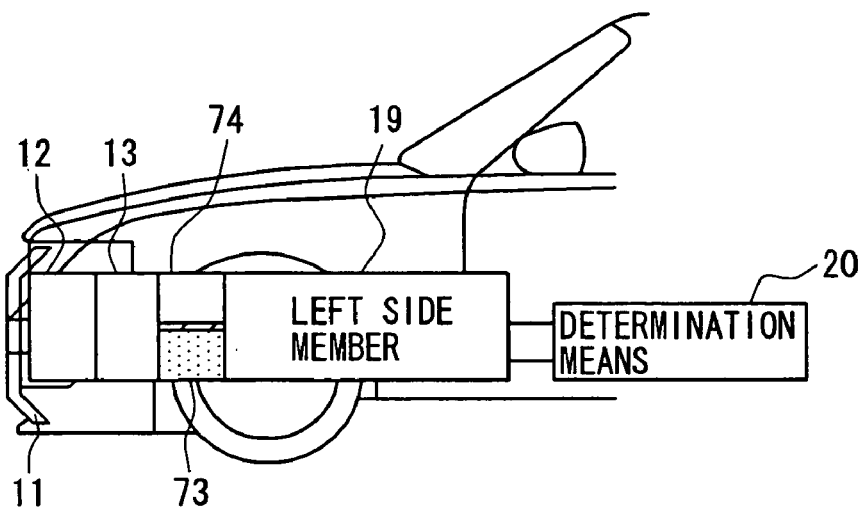
FIG. 7B is an explanatory schematic side view of the front part of the vehicle shown in FIG. 7A.

A second embodiment of the present invention will be now described with reference to FIGS. 7A and 7B. As shown in FIGS. 7A and 7B, the collision detecting apparatus has crank deformation sensors 71 to 74, in place of the crank deformation sensors 14 to 18. Here, the sensors 71 to 74 have the shape similar to the shape of the sensors 14 to 18 of the first embodiment. However, the sensors 71 to 74 are arranged in a different direction as the first embodiment. The sensors 71, 72 are arranged parallel to the horizontal direction between the reinforcement member 13 and the right side members 18. Likewise, the sensors 73, 74 are arranged parallel to the horizontal direction between the reinforcement member 13 and the left side members 19. In other words, the sensors 71 to 74 are arranged such that the up and down direction of FIG. 4 corresponds to the horizontal direction of the vehicle. Hereafter, like components are denoted by like reference numerals and a description thereof is not repeated.

A right-upper sensor 71 is located on the right lower sensor 72, and a left upper sensor 74 is located on the left lower sensor 73. Further, the right upper sensor 71 and the right lower sensor 72 are arranged in opposite directions. The left lower sensor 73 and the left upper sensor 74 are arranged in opposite directions. Specifically, the right upper sensor 71 connects the reinforcement member 13 to a right portion of the right side member 18. The right lower sensor 72 connects the right end of the reinforcement member 13 to a left portion of the right side member 18. Likewise, the left upper sensor 74 connects the reinforcement member 13 to a left portion of the left side member 19. The left lower sensor 73 connects the left end of the reinforcement member 13 to a right portion of the left side member 19. Similar to the first embodiment, the outputs of the sensors 71 to 74 are sent to the determination means 20.

In this arrangement, even if the biased load is applied to the reinforcement member 13 in the horizontal direction, the biased load is dispersed by the upper and lower sensors 71 to 74. Accordingly, the reinforcement member 13 and the right and left side members 18, 19 maintain the ideal conditions. Therefore, the above-described arrangement of the sensors 71 to 74 provides advantageous effects similar to those of the first embodiment.

A third embodiment of the present invention will be now described with reference to FIGS. 8 and 9. In the third embodiment, the collision detecting apparatus has a steering angle sensor 81, a vertical acceleration sensor 82, a yaw rate sensor 83 and a wheel speed sensor 84, and a zero point correction processing means 85 in addition to the crank deformation sensors 14 to 17 and the determination means 20. Hereafter, like components are denoted by like reference numerals and a description thereof is not repeated.

Figure 8:
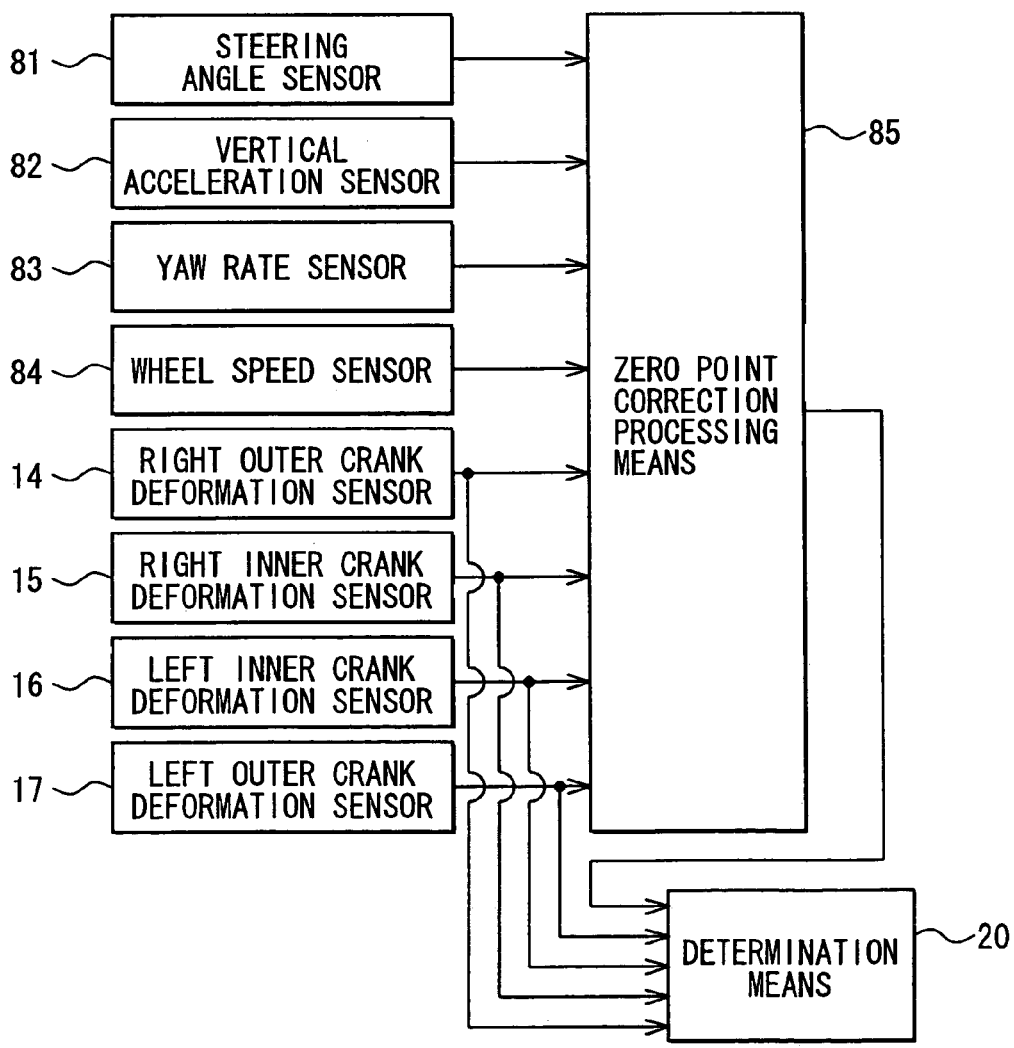
FIG. 8 is a block diagram of the collision detecting apparatus according to a third embodiment of the present invention.
Figure 9:
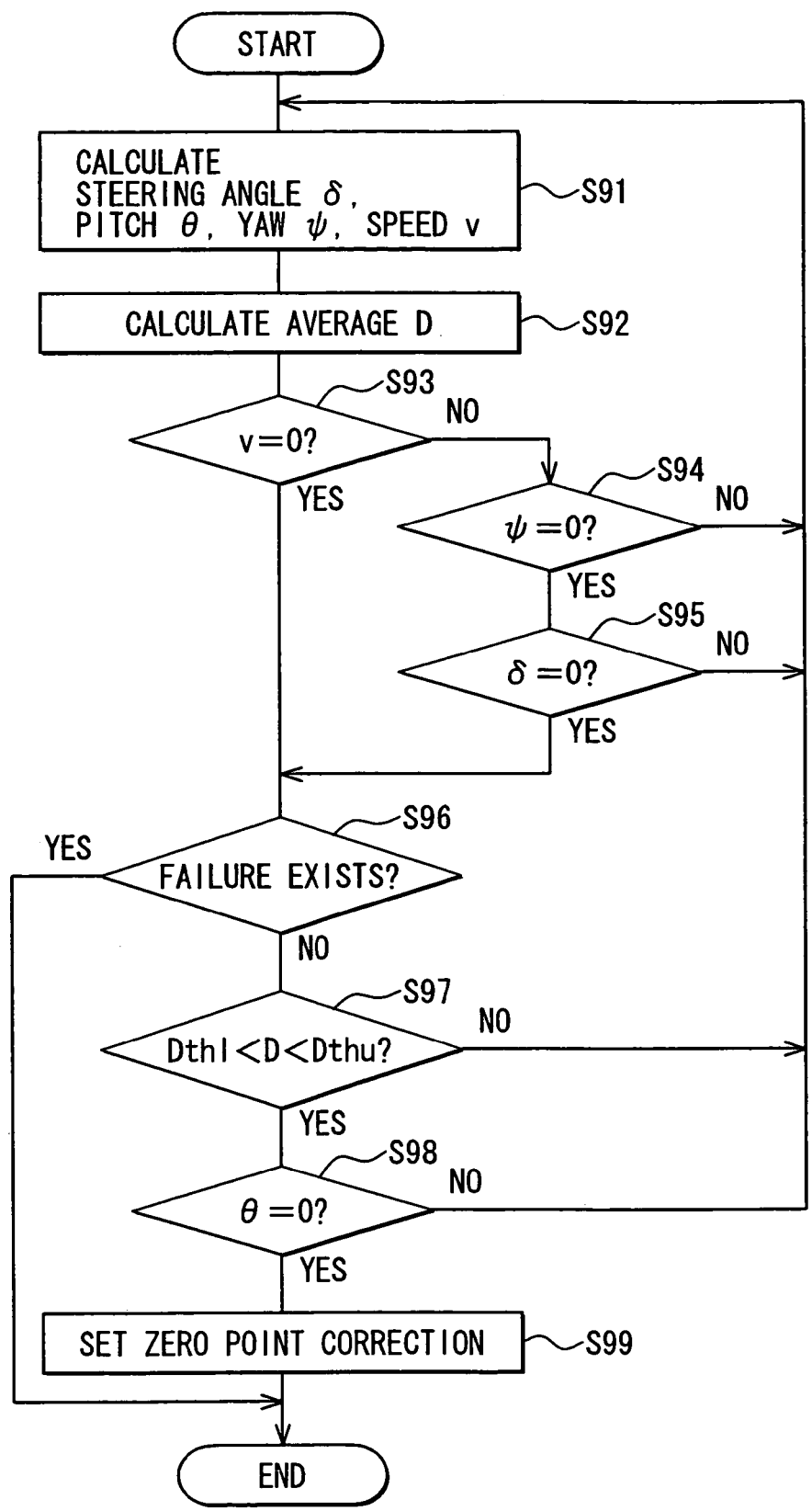
FIG. 9 is a flow chart for showing a processing executed by a zero-point correction processing means according to the third embodiment of the present invention.

As shown in FIG. 8, outputs of the preceding sensors 81 to 84 and the crank deformation sensors 14 to 18 are sent to the zero-point correction processing means 85. In the zero-point correction processing means 85, a correction value of the sensors 14 to 17 is calculated based on a processing shown in FIG. 9. The determination means 20 determines the collision based on the correction value and the collision load detected by the crank deformation sensors 14 to 18.

Next, the processing executed by the zero-point correction processing means 85 will be described with reference to FIG. 9. The zero-point correction processing means 85 starts the processing when or after ten minutes elapsed after an engine started, for example.

First, at a step S91, a steering angle δ of the steering angle sensor 81, a vertical pitch θ of the vertical acceleration sensor 82, a yaw ψ in the horizontal direction of the yaw rate sensor 83, and a vehicle speed v of the wheel speed sensor 84 are calculated. Next, at a step S92, an average D of the outputs of all the sensors 14 to 18 is calculated Next, at a step S93, it is determined whether the vehicle speed v is zero. That is, it is determined whether the vehicle is not running. When it is determined that the vehicle speed v is zero, the processing proceeds to a step S96. When it is determined that the vehicle speed v is not zero, the processing proceeds to a step S94.

At the step S94, it is determined whether the yaw ψ is zero. When it is determined that the yaw ψ is zero, the processing proceeds to a step S95. When it is determined that the yaw ψ is not zero, the processing returns to the step S91. At the step S95, it is determined whether the steering angle δ is zero. When it is determined that the steering angle δ is zero at the step S95, the processing proceeds to the step S96. When it is determined that the steering angle δ is not zero, the processing returns to the step S91.

At the step S96, it is determined whether there is information of a failure from a diagnostic system of the vehicle. When it is determined that there is the information of failure, the processing is terminated. When it is determined that there is no information of failure, the processing proceeds to a step S97.

At the step S97, it is determined whether the average D is larger than a lower threshold value Dthl and is smaller than an upper threshold value Dthu. When it is determined that the average D is in between the lower threshold value Dthl and the upper threshold value Dthu, the processing proceeds to a step S98. When it is determined that the average D is not in between the lower threshold value Dthl and the upper threshold value Dthu, the processing returns to the step S91.

Next, at the step S98, it is determined whether the pitch θ is zero. When it is determined that the pitch θ is zero, the processing proceeds to a step S99. When it is determined that the pitch θ is not zero, the processing returns to the step S91. At the step S99, the zero-point is corrected. Thereafter, the processing is terminated.

Accordingly, the correction value of the zero point is set when the average D of the outputs of the sensors 14 to 17 is between the lower threshold value Dthl and the upper threshold value Dthu in the condition that the vehicle has no failure and no acceleration in the vertical direction while it is running or not running.

In addition to the advantageous effect of the first and second embodiment, the zero error of the crank deformation sensors 14 to 18 is corrected by the zero point correction. Accordingly, even if the crank deformation sensors 14 to 17 are deteriorated over time or affected by the change of temperature, the detecting accuracy is sufficiently maintained. In the third embodiment, the sensors 71 to 74 described in the second embodiment can be employed in place of the sensors 14 to 18 of the first embodiment.

Figure 10:
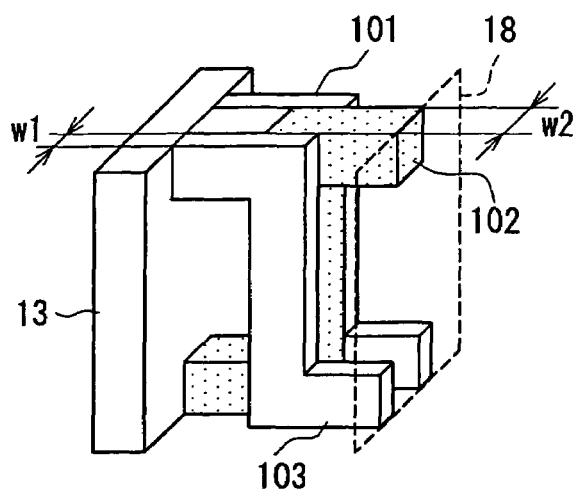
FIG. 10 is a perspective view of crank deformation sensors in which the crank deformation sensors are arranged alternately in opposite directions according to a fourth embodiment of the present invention.

A fourth embodiment of the present invention will be now described with reference to FIG. 10. In the first and second embodiments, two sensors are used at each side. In the fourth embodiment, three sensors 101 to 103 are used at each side, as shown in FIG. 10. Hereafter, like components are denoted by like reference numerals and a description thereof is not repeated.

As shown in FIG. 10, a right first crank deformation sensor 101 (hereafter, right first sensor) and a right third crank deformation sensor 103 (hereafter, right third sensor) have the same shape and thickness w1. The right first sensor 101 and the right third sensor 103 sandwich a right second crank deformation sensor 102 (hereafter, right second sensor) between them. The right second sensor 102 has a thickness w2 that is twice of a thickness w1 of the right third sensor 103.

The right first sensor 101 and the right third sensor 103 are arranged in the same direction. The first extending portions 31b of the right first sensor 101 and the right third sensor 103 connect to the reinforcement member 13 and the second extending portions 31c of the right first sensor 101 and the right third sensor 103 connect to the right side member 18. On the contrary, the right second sensor 102 is arranged in a direction opposite to the right first sensor 101 and the right third sensor 103. The first extending portion 31b of the right second sensor 102 connects to the right side member 18 and the second extending portion 31c of the right second sensor 102 connects to the reinforcement member 13.

Here, a total resiliency of the horizontal components of the right first sensor 101 and the right third sensor 103 is equal to a total resiliency of the horizontal components of the right second sensor 102. Therefore, the biased collision load, which is applied to the upper part or lower part of the reinforcement member 13, can be dispersed, similar to the first embodiment, Accordingly, advantageous effects similar to those of the first embodiment and the second embodiment can be provided. Further, the arrangement of the sensors 101 to 103 provides the reinforcement member 13 with a rigidity higher than that of the first embodiment in the horizontal direction. Also at the left end of the reinforcement member 13, three sensors are arranged in a manner similar to the right first to third sensors 101 to 103.

Alternatively, the right first sensor 101 and the right third sensor 103 can be arranged such that the first extending portions 31b thereof connect to the upper part of the right side member 18 and the second extending portions 31c thereof connect to the lower part of the reinforcement member 13. In this case, the right second sensor 102 is arranged such that the first extending portion 31b thereof connects to the upper part of the reinforcement member 13 and the second extending portion 31c connects to the lower part of the right side member 18. The arrangement of the sensors 101 to 103 of the fourth embodiment can be employed to the third embodiment. Further, the sensors 101 to 103 can be arranged horizontally, similar to the second embodiment.

In the above-described first to fourth embodiments, the following modifications can be acceptable.

In each of the crank deformation sensors, an angle between the middle portion 31a and the first extending portion 31b, and an angle between the middle portion 31a and the second extending portion 31c are arbitrarily decided as long as the first extending portion 31b and the second extending portion 31c maintain the ideal parallel condition. The angle can be an acute angle or an obtuse angle.

In the arrangement of the sensors, a clearance can be defined between the sensors. For example, in the first embodiment, it is not always necessary that the right outer sensor 14 and the right inner sensor 15 closely contact with each other. The right outer sensor 14 and the right inner sensor 15 can define a clearance between them.

In the above-described embodiments, the crank deformation sensors 14 to 17, 71 to 74, and 101 to 103 are arranged at the front part of the vehicle for detecting the collision from the front side. Alternatively, the crank deformation sensors 14 to 17, 71 to 74 and 101 to 103 can be arranged in connecting portions between side members and a reinforcement member on the rear side of the vehicle, thereby to detect a collision from the rear side of the vehicle.

The crank deformation sensors are sandwiched between the reinforcement member 13 and the right and left side members 18, 19 to connect between them. Since the crank deformation sensors are located between the rigid members, the impact to the bumper is accurately detected. The crank deformation sensors can be partly embedded in the right and left side members 18, 19 to increase the rigidity of the vehicle.

Each of the crank deformation sensor has the shape that the first extending portion 31b and the second extending portion 31c maintain parallel condition even when the middle portion 31a of the crank member is deformed. Since the first extending portion 31b and the second extending portion 31c always maintain the parallel condition, the deformation of the crank member 31 can be detected while always maintaining the constant condition. The material, size and numbers of the crank deformation sensors can be arbitrarily decided as long as the total resiliency of the crank deformation sensor(s) in the front direction is equal to the total resiliency of the crank deformation sensor(s) in the rear direction.

The zero point of the crank deformation sensors can be corrected based on at least one of the pitch θ, the vehicle speed v, the steering angle δ, the yaw rate ψ, and the information of failure in the vehicle. Further, the zero point of the crank deformation sensors can be corrected by the zero point correction processing means 85 when the steering angle δ is within a predetermined range. Thus, the zero point is corrected in a condition that the behavior of the vehicle is stable, that is, the crank deformation sensors have no load. Accordingly, the accuracy of the correction improves.

Similarly, the zero point of the crank deformation sensors can be corrected by the zero point correction processing means 85 when the yaw moment ψ is within a predetermined range. Thus, the zero point is corrected in a condition that the behavior of the vehicle is stable, that is, the crank deformation sensor have no load. Accordingly, the accuracy of the correction improves.

Similarly, the zero point of the crank deformation sensors can be corrected by the zero point correction processing means 85 when the pitch θ is within a predetermined range. Thus, the zero point is corrected in a condition that the behavior of the vehicle is stable, that is, the crank deformation sensors have no load. According, the accuracy of the correction improves.

Furthermore, the zero point of the crank deformation sensors can be corrected by the zero point correction processing means 85 when there is no information about the failure of the vehicle. Since the zero point is corrected only when the vehicle has no failure, it is less likely that a malfunction will occur.

Also, the zero point of the crank deformation sensors can be corrected by the zero point correction processing means 85 when the outputs of the collision detecting means are within a predetermined range. It is not preferable to perform the zero point correction based on the outputs of broken crank deformation sensors. The zero point is corrected when the collision detecting means are not broken, that is, the outputs are not beyond the predetermined range. Accordingly, the zero point is effectively corrected.

Preferred embodiments of the present invention are described above. However, the present invention is not limited to the above embodiments, but may be implemented in other ways without departing from the spirit of the invention.

What is claimed is:

1. A collision detecting apparatus for a vehicle having a reinforcement member and side members, the collision detecting apparatus comprising:

a plurality of collision detecting means located between the reinforcement member and one of the side members; and a determination means determining a collision based on at least one of outputs of the plurality of collision detecting means, wherein each of the plurality of collision detecting means has a crank member and a deformation detecting member, the crank member includes a middle portion having a resiliency, a first extending portion extending from a first end of the middle portion and a second extending portion extending from a second end of the middle portion in a direction opposite to the first extending portion, the deformation detecting member is disposed at a center of the middle portion for detecting a deformation of the middle portion, wherein a first collision detecting means, which is one of the plurality of collision detecting means, and a second collision detecting means, which is another one of the plurality of collision detecting means, are arranged in opposite directions such that the middle portion of the first collision detecting means is parallel to the middle portion of the second collision detecting means, the first extending portion of the first collision detecting means and the second extending portion of the second collision detecting means connect to the reinforcement member, and the second extending portion of the first collision detecting means and the first extending portion of the second collision detecting means connect to the side member.

2. The collision detecting apparatus according to claim 1, wherein the first collision detecting means is arranged such that the first extending portion connects to a first part of a surface of the reinforcement member, the surface being opposed to a surface of the side member, and the second extending portion connects to a second part of the surface of the side member, and the second collision detecting means is arranged such that the first extending portion connects to a first part of the surface of the side member and the second extending portion connects to a second part of the reinforcement member, the first parts of the reinforcement member and the side member being located higher than the second parts of the reinforcement member and the side member, respectively.

3. The collision detecting apparatus according to claim 1, wherein the first collision detecting means is arranged such that the first extending portion connects to a first part of a surface of the reinforcement member, the surface being opposed to a surface of the side member, and the second extending portion connects to a second part of the surface of the side member, and the second collision detecting means is arranged such that the first extending portion connects to a first part of the side member and the second extending portion connects to a second part of the reinforcement member, the first parts of the reinforcement member and the side member being on a right side of the second parts of the reinforcement member and the side member, respectively.

4. The collision detecting apparatus according to claim 1, wherein each of the plurality of collision detecting means is disposed such that the first extending portion and the second extending portion are maintained parallel to each other when the middle portion is deformed.

5. The collision detecting apparatus according to claim 1, wherein the plurality of collision detecting means are disposed such that a total resiliency in a front direction of the vehicle is equal to a total resiliency in a rear direction of the vehicle.

6. The collision detecting apparatus according to claim 1, wherein the collision detecting means are located between the reinforcement member and the side member at a front part of the vehicle.

7. The collision detecting apparatus according to claim 1, wherein the collision detecting means are located between the reinforcement member and the side member at a rear part of the vehicle.

8. The collision detecting apparatus according to claim 1, further comprising a zero point correction processing means that corrects a zero point of the plurality of collision detecting means based on at least one of a steering angle, a yaw rate, a diagnostic information, a vertical pitch, and a speed of the vehicle.

9. The collision detecting apparatus according to claim 8, wherein the zero point correction processing means corrects the zero point of the plurality of collision detecting means when the steering angle is within a predetermined range.

10. The collision detecting apparatus according to claim 8, wherein the zero point correction processing means corrects the zero point of the plurality of collision detecting means when the yaw rate is within a predetermined range.

11. The collision detecting apparatus according to claim 8, wherein the zero point correction processing means corrects the zero point of the plurality of collision detecting means when it is determined that there is no failure in the vehicle.

12. The collision detecting apparatus according to claim 8, wherein the zero point correction processing means corrects the zero point of the plurality of collision detecting means when the pitch is within a predetermined range.

13. The collision detecting apparatus according to claim 8, wherein the zero point correction processing means corrects the zero point of the plurality of collision detecting means when outputs of the collision detecting means are within a predetermined range.

* * * * *